United States Patent

[11] 3,572,511

| [72] | Inventor | Lee Triplett<br>2878 South 8600 West, Salt Lake City, Utah |
|---|---|---|
| [21] | Appl. No. | 747,952 |
| [22] | Filed | July 26, 1968 |
| [45] | Patented | Mar. 30, 1971 |

[54] MULTIPLE MEMBER ASSEMBLY
1 Claim, 5 Drawing Figs.

[52] U.S. Cl. .................................................. 211/105.6, 287/126
[51] Int. Cl. ................................................. A47h 1/08, F16b 7/18
[50] Field of Search........................................ 211/105.6, 105.4, 105.3; 287/126, 124, 114, 60; 85/70, 71, 67; 151/7; 85/81, 5.5, 5 (M), 5 (B), 5 (E)

[56] References Cited
UNITED STATES PATENTS

| 2,326,866 | 8/1943 | Kincaid............................ | 287/126X |
| 2,353,248 | 7/1944 | Lamb............................... | 85/70X |
| 2,430,486 | 11/1947 | Van Sittert et al................ | 85/81 |
| 2,446,406 | 8/1948 | Beyerle............................ | 287/124X |
| 2,637,555 | 5/1953 | Klavdt............................. | 211/105.4X |
| 2,726,888 | 12/1955 | Frantz............................. | 287/126X |
| 3,333,873 | 8/1967 | Triplett........................... | 287/126X |

*Primary Examiner*—Ramon S. Britts
*Attorney*—M. Ralph Shaffer

ABSTRACT: A multiple member assembly which includes interiorly located, compression-type friction locks for releasably securing two or more members of the assembly together. One of the members can comprise a work piece, when desired. In one embodiment of the invention the multiple member assembly, constructed in accordance with the teachings of the invention, comprises an elongate rod assembly and provides means for mounting the assembly between two supports, such as wall panels, and also for tightening the same into position.

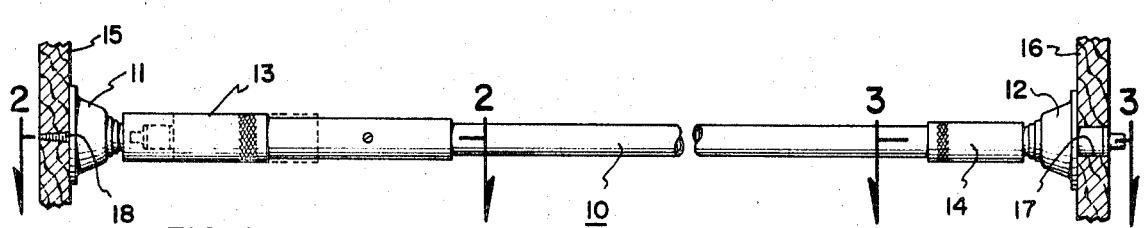
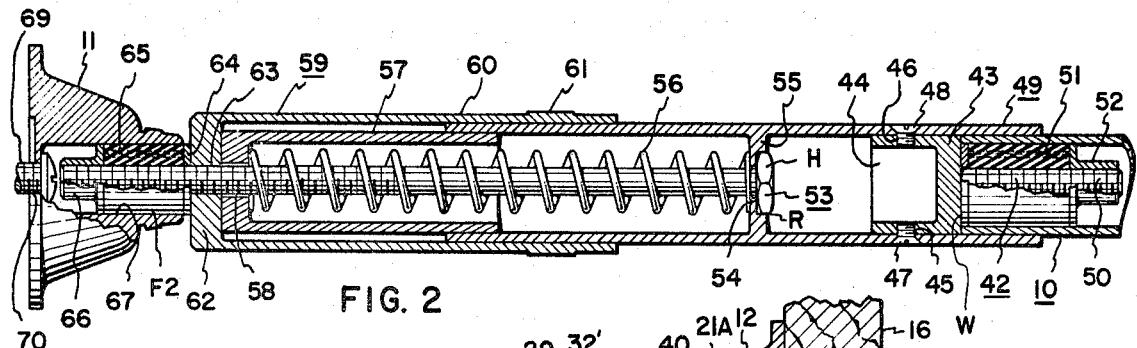
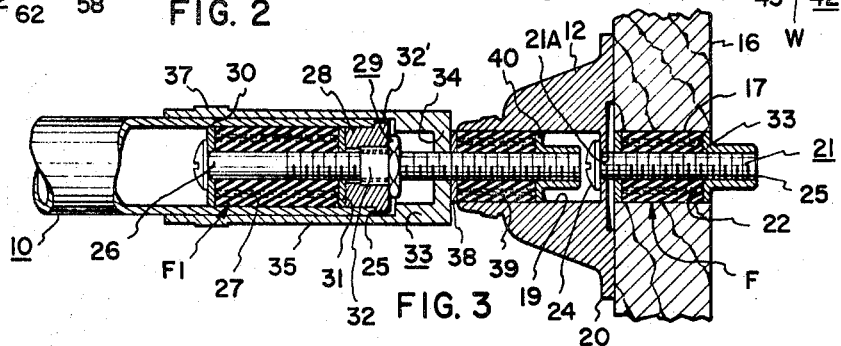
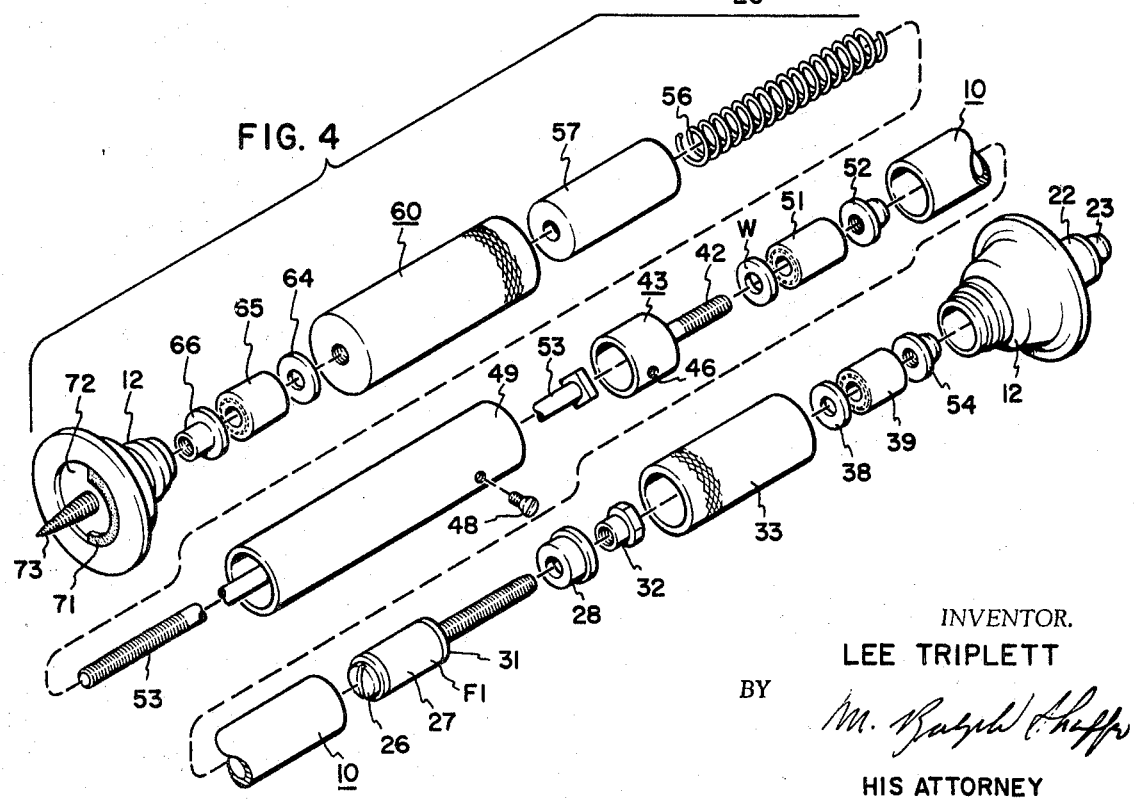
INVENTOR.
LEE TRIPLETT

Patented March 30, 1971

INVENTOR.
LEE TRIPLETT
BY M. Ralph Shaffer

HIS ATTORNEY

MULTIPLE MEMBER ASSEMBLY

SPECIFICATION

The present invention relates to multiple member assemblies and, more particularly, to a new and improved multiple member assembly incorporating interior, compression-type friction locks between adjacent parts.

Accordingly, a principal object of the present invention is to provide a new and improved, multiple member assembly construction.

A further object is to provide a multiple member assembly construction wherein two or more parts or members thereof are secured together through the incorporation of interiorly disposed, compression-type friction locks.

A further object of the invention is to provide a new and improved, multiple member assembly wherein certain compression-type friction lock means are used to releasably obtain together selected parts of the assembly.

An additional object of the invention is to provide a work piece or other utility member to which handles, extensions, or other parts may be secured as by a compression-type friction lock interiorly disposed with respect to the work piece, especially when such handles are turned on the friction locks.

An additional object is to provide an elongate multiple member assembly incorporating the features of the present invention, and especially the friction-lock teaching herein.

A further object of the invention is to provide, as new and improved multiple member assembly, a closet pole construction, hanger pole, and so forth, wherein the ends thereof incorporate suitable, interior friction-lock means for securing the multiple member assembly to mounts attached or otherwise cooperatively disposed with respect to the wall panels, and wherein the ends of the multiple member assembly may be manipulated both to secure the multiple member assembly ends to their mounts and also to provide a rigid multiple member assembly construction, the same being fixedly or releasably secured in place, as desired.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front elevation of one embodiment of the invention wherein the same takes the form of a multiple member assembly cooperatively disposed with respect opposite walls for other supports.

FIG. 2 is an enlarged fragmentary section of the multiple member assembly of FIG. 2 and is taken along the line 2–2 in FIG. 1.

FIG. 3 is an enlarged fragmentary section of the structure of FIG. 1 and is taken along the line 3–3 in FIG. 1.

FIG. 4 is an exploded view of all the parts utilized in the multiple member assembly construction as shown in FIGS. 1––3.

Figure 5:
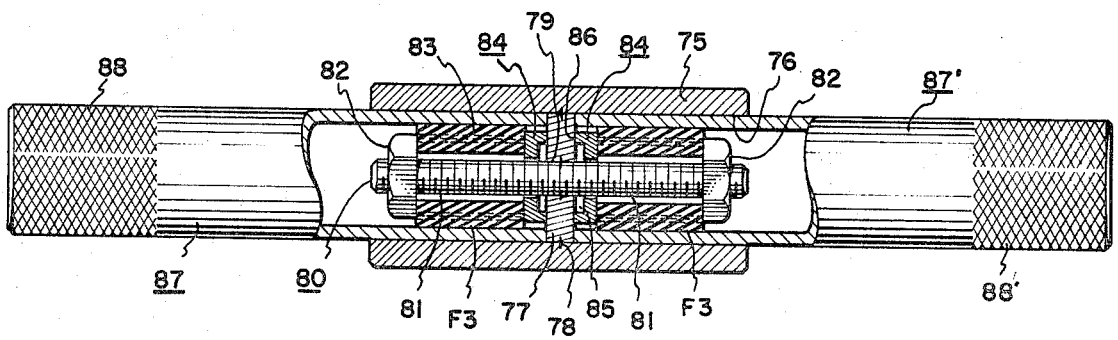
FIG. 5 illustrates a second embodiment of the invention wherein interior friction locks are used relative to a principal member such as a work piece, and wherein, further, one or more external members such as handles may be affixed to the work piece through employment of the compression, friction-lock devices thereof and the rotation of the handles thereon.

In FIG. 1 multiple member assembly 10 is shown to be provided with end mounts 11 and 12 and certain other structure at 13 and 14 which will be described hereinafter. The multiple member assembly 10 and its associated structures are designed for releasable or fixed attachment to and support by a pair of spaced supports such as walls 15 and 16. The latter include, preferably, apertures 17 and 18 for desired attachments, when needed.

References have now been made to FIG. 3 wherein the right-hand portion of the device will be examined in detail. End mount 12 is provided with an interior bore 19 and a base 20, the latter of which includes aperture 21. Disposed through aperture 21A is a bolt 22 provided with an axially compressible, radially expandible sleeve 22 preferably made of elastomeric material. In this event it is much preferred that such elastomeric material include an embedded tubular web made of rayon, nylon, or other meshed or interwoven material. Backing the sleeve 22 is a nut 23 threadedly engaging bolt 21. Bolthead 24, of course, integrally forms with bolt shank 25.

In assembly and mounting, it will be seen with reference to FIG. 2 that the end mount 12 is suitably placed over provided aperture 17 and, with the friction-lock device F preliminarily installed, the bolt will be turned at bolthead 24 until the nut 23, in advancing up the bolt, axially compresses elastomeric sleeve 22 so as to provide a tight friction lock as produced through the radial expansion of sleeve 22. The friction-lock device, hence, will be referred to as the combination of bolt 21, sleeve 22, and nut 23.

Into the right end 25 of multiple member assembly 10 will be dispose another friction-lock device F1, this time taking the form of a bolt 26, compression sleeve 27, bushing 28 and nut 29. Also preferably included will be washers 30 and 31. Headed bushing 28 is provided so as to increase the strength of the bolt against forces of shear. Additionally, nut 29 includes a turned-down portion 32 and flange-head 32' in order that the latter may engage bushing 28 and compress sleeve 27 upon rotation of, this time, nut 29.

Elongate sleeve nut 33 includes threaded base 34 engaging bolt 26 and also a sleeve portion 35 integral therewith, i.e. base 34, and provided with annular knurled portion 37.

As to assembly and operation of this portion of the structure, it will be noted that the friction-lock device F1 in the form of washers 30 and 31, bolt 26, sleeve 27, and bushing 28 will be preliminarily inserted in multiple member 10 in the manner illustrated in FIG. 3. Subsequently, the nut 29 will be turned down the threaded shank 34 of bolt 26. A wrench may be used to tighten the nut so as to provide a secure friction-lock through the compression of (an radial forces produced in) sleeve 27.

When the above assembly has been accomplished, then the sleeve nut 33 is turned down threaded shank of bolt 26 to advance in a direction to the right, to the position indicated in FIG. 3. Washer or bearing 38 is next slipped onto the threaded shank of bolt 26 as is also compression sleeve 39 and nut 40. Nut 40 is turned to give a slight preload to compression sleeve 39. Thus, that portion of the structure to the right of sleeve nut 33 is ready for selective insertion into end mount 12. Subsequently, the rotational displacement of sleeve nut 33 and its threading to the right along the shank of bolt 26, with which it threadedly cooperates, operates to urge the washer 38 to the right and also compress elastomeric sleeve 39, thereby producing a tight friction-lock within bore 19 of end mount 12. Thus, the discussion thus far given, indicates in full the entire manner of assembly and securement of the right end of the multiple member assembly 10 to the structure associated within mount 12.

The left-hand side of multiple member assembly 10 is illustrated in FIG. 2. It is seen that a bolt 42 includes an enlarged, uniquely configured head 43 having an interior access area 44. Head 43 may be provided with threaded apertures 45 and 46 to receive setscrews 47 and 48. At this point it should be mentioned in lieu of setscrews, it is possible simply for spot welds or other securement means to be provided in connection with a fixed or other type of cooperation between head 43 and the main cylinder body 49 of the structure.

In any event, bolt 42 includes a head 43, and a stud comprises the shank 50 which is made integral or otherwise securely affixed to the bolthead 43 previously described. Disposed upon threaded shank 50 of bolt 42 are washer W, compression sleeve 51, similar to that heretofore described, and also a nut 52 threadedly engaging the bolt shank.

At this point, and upon preliminary insertion of bolt 53 through aperture 54 of partition 55, the cylinder body 49 may be slipped over the bolthead 43 and setscrews used as indicated in FIG. 2 to secure the cylinder body to the configured bolthead 43 in the manner indicated. It becomes thus apparent that when the user desires to supply a compression lock of multiple member assembly 10 within cylinder body 49, then cylinder body 49 need only be rotationally displaced in order to turn the bolthead 43 of bolt 42 and thus cause that the nut 52 advance by virtue of its frictional engagement with sleeve 51, thereby expanding the same outwardly to tightly engage the multiple assembly member 10 between the sleeve and cylinder body 49.

As to the remainder of the left-hand structure related to the multiple member assembly 10, it will be seen that a compression spring 56 is disposed over bolt 53 (having head H disposed in keying recess R), and is backed by a cylindrical guide 57. Cylindrical guide 57 merely acts as a spring guide and includes a base aperture 58 simply engaging in slip fit relationship the bolt 53. Disposed over this combination is an elongate sleeve nut 59 having sleeve portion 60 provided with annular knurled portion 61. The elongate sleeve nut also includes a threaded base 62 having threaded aperture 63 engaging the threaded shank of bolt 53.

Disposed upon the bolt shank to the left of base 62 is a washer 64 backed by compression sleeve 65. The latter is retained in place and is compressed by nut 66 threaded onto the threaded shank of bolt 53. It is noted that end mount 11 is provided with a bore 67 receiving the compression structure hereinbefore described. In order to insert the same in the end mount 11, the bolt 53 is simply urged to the right against the springed pressure of compression spring 56 such that the bolthead at H advances to the right, conceivably into open area 44 of bolthead 43. At this point the compression lock F2 is disposed in bore 67 of end mount 11, and such dispositions is easily achieved through action of compression spring 56 advancing this entire structure to the left of the principal multiple member assembly 10. Once such engagement has been achieved, then it is simply a matter of turning sleeve nut 59 so as to compress sleeve 65 within the bore of end mount 11. Such securement accordingly fixes the disposition of the assembly on the left side of multiple member assembly 10 so that further longitudinal displacement of bolt 53 to the right is prevented in the absence of loosening the compression fit of friction-lock device F2 within end mount 11.

At this juncture it is seen that the entire structure is in place an ready to support external objects as placed upon the multiple member assembly 10 or its associated structure.

In order to keep the end mount preliminarily in place against their walls 15 and 16, there may be supplied screw 69 through aperture 70 which actually screws into the wall. Alternatively, there may be included rubber or other elastomeric washers or spacers 71 within recess 72 of the ends of the end mounts, see FIG. 4, and simply pointed protrusions 73 which stick into appropriate points of the opposite walls involved.

FIG. 4 illustrates the entire structure in exploded view so that the parts enumerated with particularity in FIGS. 2 and 3 may be completely understood, both per se and in relationship to each other.

What hence has been provided is a novel support pole construction or similar article wherein by virtue of the inclusion of a series of friction-lock devices the pole construction can be supported from opposite walls or other fixed supports.

In FIG. 5 principal member 75 may comprise a workpiece, such as a threading die or other member and, in any event, will preferably include a cylindrical bore 76 into which is disposed a central partition 77. The partition or fixed transverse portion is spot-welded or otherwise secured at 78 to the principal member. Of course, it will be understood that any type of securement and/or inner engagement is permitted at 78, this so long as there is a rigid attachment of the partition to principal member 75. Partition 77 is provided with a threaded aperture 79 which receives stud 80. Stud 80 comprises a pair of threaded shank portions 81 upon which are threaded the nuts 82. The sleeves 83 are radially expansible, axially compressible, and comprise friction-locking sleeves of elastomeric material, preferably. Disposed between partition 77 and sleeves 83 are respective bearings 84. Each of the bearings 84, preferably, is recessed at 85 to provide a thin bearing rim at 86. Bearing rim 86 engages the partition 77 in the manner shown, this is for the purpose that, first, there be a reduced coefficient of friction present between the metal bearing and metal partition and, second, that the surface of contact between the two be minimized. Accordingly, as nuts 82 become threaded toward the partition to expand compression sleeves 83, in a manner hereinafter explained, a combination of respective nuts 82, sleeves 83, and respective bearings 84 will rotate together about the axis of stud 80. Yet, the reduced friction present between bearing 84 and partition 77, as a consequence of the narrowness of the respective bearing rim, permits the units to turn easily against partition 77.

In returning to the structure of FIG. 5, it is seen that second members 87 and 87' may comprise handles or other types of members and, in the embodiment shown, are hollow cylinders knurled at 88 and 88' and the ends of which abut partition 77. Sleeves 83 will be designed so that their exterior surfaces lightly, frictionally engage the interior walls of second members 77 and 78. Accordingly, and with a slight preload existing as to the resilient sleeves 83 (as a consequence of thumb and finger advancement of nuts 82 upon shank portions 81), the second members 87 and 87' may be thrust over the resilient sleeves and into the space between the sleeves and the inner wall of principal member 75. A respective rotation of a second member will carry the sleeve around with it, owing to the friction engagement between the sleeve and the second member. The sleeve, in turn, carries the nut and bearing such that there is a revolvement and a progression of a nut 82 toward partition 77. This, in turn, enlarges the sleeve wall and increases its force of engagement between threaded shank 81 and member 88, so that there is a progressive tightening of the friction lock between the respective sleeves 83 and second members 87 and 87' and, consequently, between the second members and principal member 75. Furthermore, and a most important point, the second members 87 and 87' are drawn inwardly toward the partition so that the ends of the second members tightly engage and are brought home toward partition 77. This is because of the progression of the compressible sleeves 83 toward partition 77, and as a consequence of the automatic tightening of nuts 82 produced through the rotation of the handles.

To release the friction locks of second members 87 and 87'one need only rotate the member in the opposite direction so as to cause the sleeves, and hence the nuts 82, to rotate in the opposite direction, thereby reducing compression of the sleeves and releasing the respective friction locks Subsequently, the second members may be easily removed from their respective friction locks F3.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a tubular principal member, a threaded stud axially secured to an end of said principal member, a radially expandable, axially compressible friction sleeve disposed over said stud, an external member provided with an aperture operatively receiving said sleeve, a nut backing said sleeve, and a sleeve nut threaded onto said stud, encompassing said principal member, and having an end portion operatively thrustable against said sleeve for selectively compressing the latter, and wherein said structure is provided with friction-lock means, in the form of a second radially expandable, axially compressible friction sleeve surrounding said stud between the end thereof which is secured to said principal member and a second nut threaded onto a portion of said stud within said sleeve nut to axially compress said second sleeve, for locking said stud to and within said principal member.